Figure 1:
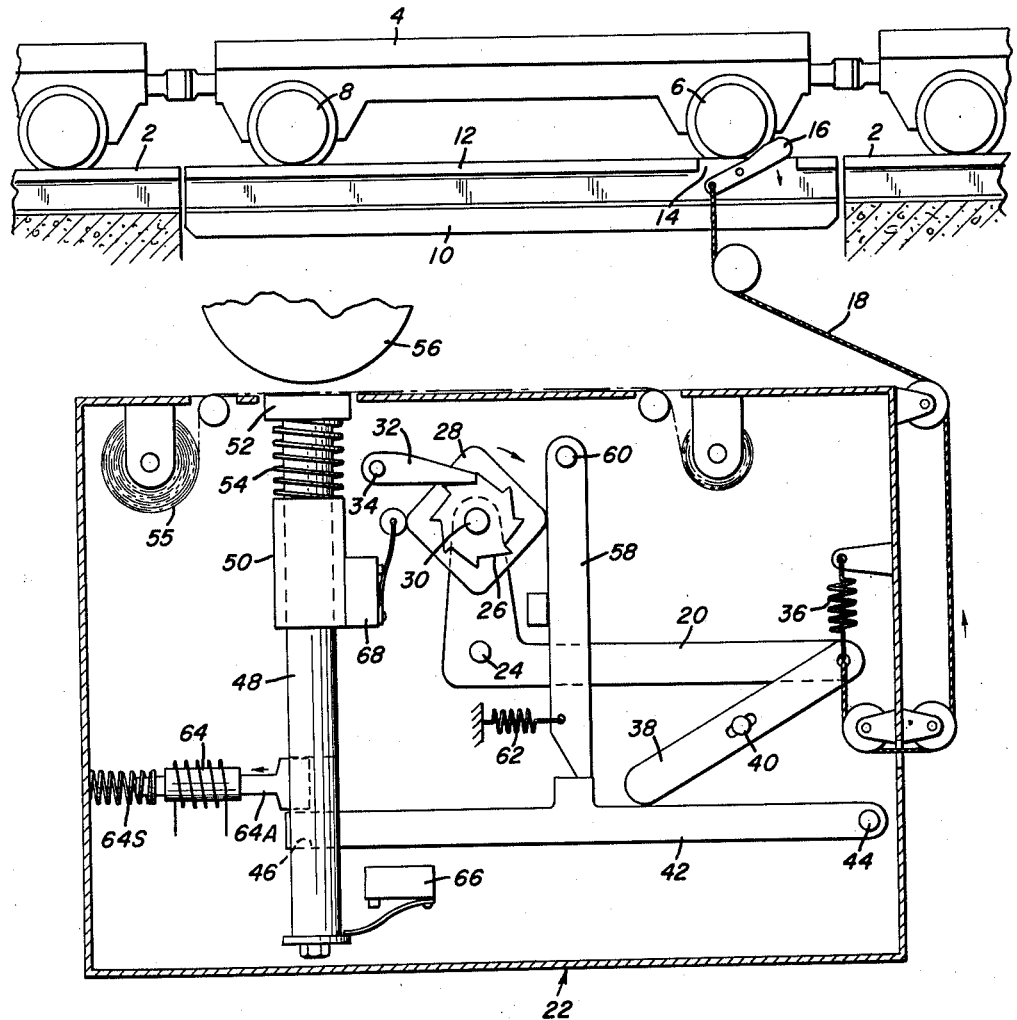

Oct. 8, 1963   E. E. BENSEMA ET AL   3,106,259
APPARATUS FOR WEIGHING A MOVING OBJECT
Filed Jan. 22, 1959   2 Sheets-Sheet 1

INVENTORS
EUGENE E. BENSEMA and
CHARLES A. BRADY
By Donald G. Dalton
Attorney

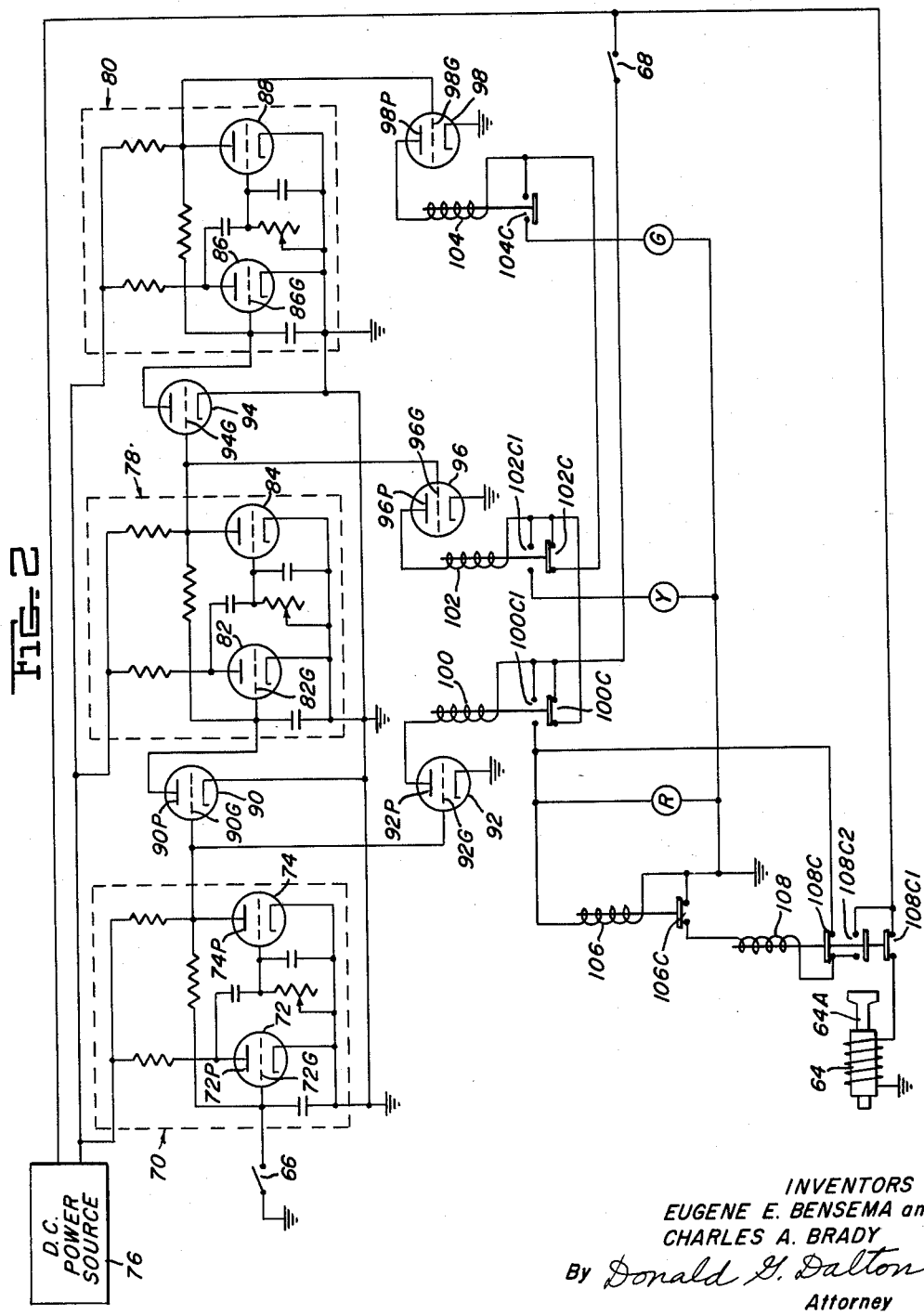

3,106,259
APPARATUS FOR WEIGHING A MOVING OBJECT
Eugene E. Bensema and Charles A. Brady, Chicago, Ill., assignors to United States Steel Corporation, a corporation of New Jersey
Filed Jan. 22, 1959, Ser. No. 788,401
2 Claims. (Cl. 177—12)

This invention relates to apparatus for weighing a moving object and more particularly for weighing a loaded car traveling over a scale platform. In a steel mill it is common practice to place material on cars or wheeled buggies and weigh them as they travel along a track. For example, in charging open hearth furnaces the scrap and other materials to be charged in the furnace are so weighed. In order to obtain the desired chemical analyses it is important that the weights of the various materials, particularly the scrap, be accurate. It is also desirable that the total weight of the steel produced be within relatively close limits so that little or no steel will be left over after filling the last ingot mold.

Weighing tests have disclosed that the accuracy of weights obtained when weighing in motion is influenced by the reaction speed of the scale, the weighing track alignment and grade, and the speed of the weighing movement over the scale. The tests further indicated that serious weight errors occurred when the weighing speed exceeded a specific maximum, this maximum speed being a function of the car length, the scale platform length and the speed of reaction or response of the scale weight recording mechanism.

Since it is desirable to weigh at the maximum permissible speed to meet production requirements, it is necessary that the locomotive engineer be aware of the speed at which he is conducting the weighing movement in order that he may approach as nearly as possible the maximum permissible speed without exceeding it.

It is therefore an object of our invention to provide apparatus for weighing a moving object wherein a signal is given when the object exceeds a predetermined speed.

Another object is to provide such apparatus wherein a signal is automatically given when the object slows below a predetermined speed.

A still further object is to provide such apparatus which will prevent operation of the weight recording means when the object exceeds the predetermined speed.

These and other objects will be more apparent after referring to the following specification and attached drawings, in which:

FIGURE 1 is a schematic view of our invention as associated with a traveling buggy; and FIGURE 2 is a schematic electrical diagram of the invention.

Referring more particularly to the drawings, reference numeral 2 indicates the rails over which a car or buggy 4 passes. The particular type of buggy shown has a set of front wheels 6 and a set of rear wheels 8. A scale platform 10, having rails 12 thereon, is provided with the rails 12 being in alignment with the rails 2. The tread of one of the rails 12 is cut away at 14 and a lever 16 is mounted on the rail with the top thereof extending upwardly through the cut away portion 14. The lever 16 is connected by means of a wire rope 18 to one end of a trip lever 20 which forms part of a standard type of recorder 22 for a standard scale. For example, the scale may be a Streeter-Amet lever scale with a Streeter-Amet M22C dial indicator and recorder. However, the scale and recorder are not part of the present invention and therefore are not being described in detail except for the parts used in conjunction with the particular apparatus of our invention. The lever 20 is L-shaped and is mounted on recorder frame by means of a pivot 24 at the intersection of the legs of the lever. A ratchet 26 and cam 28 are mounted on the end of the lever 20 remote from the connection of wire rope 18 by means of a pin 30. A pawl 32 engages ratchet 26 and is pivotally mounted on the housing of recorder 22 by means of a pin 34. A spring 36 has one end connected to lever 20 and the other end connected to the housing 22 so as to bias the lever 20 in a counter-clockwise direction. A cocking lever 38 is connected to the end of lever 20 adjacent the connection of wire rope 18. The lever 38 is mounted on the housing of recorder 22 intermediate its ends by means of a pivot pin 40. The other end of lever 38 is located adjacent a sear lever 42 which is connected to housing 22 by means of a pivot pin 44. The other end of lever 42 passes through an elongated opening 46 in an imprint hammer plunger 48. The plunger 48 is slidably mounted in a bracket 50 mounted on housing 22 and has a print hammer 52 at its upper end. A spring 54 surrounds the plunger 48 with one end bearing against the bracket 50 and the other end bearing against the hammer 52 so as to bias the hammer upwardly. A paper tape 55 extends between the hammer 52 and a type wheel 56 which cooperate to print the weight on the paper tape 55 in the usual manner. A sear arm 58 is mounted on the housing 22 by means of a pivot pin 60 adjacent cam 28 and extends downwardly past lever 20 to a position adjacent lever 42. A spring 62 has one end connected to the lower end of sear arm 58 and the other end connected to housing 22 so as to bias the sear arm 58 in a clockwise direction. A solenoid 64 is mounted adjacent the plunger 48 and has an armature 64A which is movable into and out of opening 46. The solenoid 64 is such that when it is deenergized its armature 64A is moved by spring 64S into opening 46 so that the print hammer 52 cannot print. A microswitch 66 is mounted on housing 22 adjacent the bottom of plunger 48 and is closed thereby when the plunger moves upwardly. A microswitch 68 is mounted adjacent the cam 28 for actuation therewith.

The switch 66 is connected in series with a monostable multivibrator 70 which is a standard piece of equipment. As shown, multivibrator 70 includes two triodes 72 and 74 connected as shown with the switch 66 being connected in series with grid 72G. A D.C. power source 76 is connected to plates 72P and 74P of the multivibrator 70 as shown. Second and third monostable multivibrators 78 and 80 are connected in series with multivibrator 70 as shown. Multivibrators 78 and 80 are of the same type as multivibrator 70 with the multivibrator 78 having two triodes 82 and 84 and the multivibrator 80 having triodes 86 and 88. The output of multivibrator 70 is connected to grid 90G of a triode 90 and to grid 92G of a thyratron tube 92. Plate 90P of tube 90 is connected to grid 82G. The output of multivibrator 78 is connected to grid 94G of triode 94 and to grid 96G of thyratron tube 96. The output of multivibrator 80 is connected to grid 98G of thyratron tube 98. A relay coil 100 is connected in series with plate 92P and with switch 68. The relay coil 100 has normally closed contact 100C and normally open contact 100C1. A relay coil 102 having a normally closed contact 102C and normally open contact 102C1 is connected in series with plate 96P, contact 100C and switch 68. A relay coil 104 having normally open contact 104C is connected in series with plate 98P, contacts 102C and 100C and switch 68. A time delay relay coil 106 is connected in series with contact 100C1 and switch 68. The relay coil 106 has a normally closed contact 106C which is connected in series with a relay coil 108 having normally closed contacts 108C and 108C1 and normally open contact 108C2. Coil 108 is connected in series with contacts 108C, 100C1 and switch 68. Coil 108 is also connected in series with contact 108C2 to power source 76. Contact 108C1 is connected to power source 76 in series with solenoid 64. A red signal light R is connected in series with contact 100C1 and switch 68. A yellow signal light Y is connected in series with contacts 102C1 and 100C and switch 68. A green signal light G is connected in series with switch 68 and contacts 100C, 102C and 104C. The signal lights R, Y and G are mounted in the manner of traffic lights where they will be in clear view of the engineer.

The operation of our device is as follows:

When the front wheel 6 operates the lever 16, the trip lever 20 is moved clockwise, the cocking member 38 also moves clockwise out of the way of sear lever 42, the ratchet 26 moves to permit pawl 32 to engage the next tooth thereon, cam 28 moves to the right to force sear arm 58 counter-clockwise out of engagement with sear lever 42 and also opens switch 68. Since the solenoid 64 is energized through contact 108C1 it is out of the slot 46, thus permitting the spring 54 to move the plunger 48 upwardly and close switch 66 momentarily. When the wheel 6 releases lever arm 16, spring 36 will move the parts back to their original position except that cam 28 will have rotated out of contact with switch 68. Closing of switch 66 puts a pulse on grid 72G and triggers multivibrator 70 and transfers it to its unstable state. After an exact time period determined by the setting of its controls the multivibrator 70 will return to its stable state. At this time the output pulse from mulivibrator 70 is applied through triode 90 to grid 82G, thus triggering multivibrator 78. After another exact time period the multivibrator 78 will return to its stable state and its output pulse is applied through the triode 94 to grid 86G. This triggers multivibrator 80 and transfers it to its unstable state. After a third exact time period it will return to its stable state. While multivibrator 70 is in its unstable state thyratron tube 92 will be in a conductive condition, that is, it will have a zero bias. Likewise, when multivibrators 78 and 80 are in their unstable state thyratron tubes 96 and 98, respectively, will be in conductive condition. When the wheel 8 depresses lever 16 the lever 20 will again rotate in a clockwise direction, thus rotating ratchet 26 through another 45° and also moving cam 28 to a position to close switch 68 when the spring 36 brings lever 20 back to the position shown. If the switch 68 closes while multivibrator 70 is in its unstable state, relay coil 100 will be energized and the light R will go on. At the same time, time delay relay coil 106 will be energized but its contact 106C will remain closed until a predetermined time interval such as twenty seconds. Also, relay coil 108 will be energized opening contact 108C1 and deenergizing solenoid 64 so that the spring 64S will force the armature 64A into slots 46 to prevent operation of the print hammer 52. Contact 108C2 will close, thus locking relay coil 108 in and completing a circuit through contacts 106C and 100C1 to relay coil 100. Thus, opening of switch 68 will not deenergize relay coil 100, and since tube 92 continues to conduct as long as current is supplied to plate 92P the coil 100 will remain energized until contact 106C opens. Since the distance between wheels 6 and 8 is known and since the time period of the multivibrators is known the sequential operation of the lever 16 provides a measure of speed of the vehicle or car 4. Thus, when the car 4 exceeds the predetermined speed no weight will be recorded and the engineer will know from the signal of the light R that the weighing must be repeated. If the multivibrator 70 is in a stable condition when the switch 68 is closed the tube 92 will not conduct. If the wheel 8 depresses lever 16 while multivibrator 78 is in an unstable condition relay coil 102 will be energized from power source 76 through switch 68 and contact 100C, thus closing contact 102C1. This will energize light Y through switch 68 and contacts 100C and 102C1. When the light Y is lit the engineer will know that he is approaching the maximum permissible speed and will slow down the train. If multivibrator 78 is in stable condition when the wheel 8 depresses lever arm 16 the tube 96 will not conduct. If the multivibrator 80 is in unstable condition when the wheel 8 depresses lever 16, tube 98 will conduct and relay coil 104 will be energized through switch 68 and contacts 100C and 102C. This will close contact 104C, thus lighting light G and informing the engineer that he is moving at the correct operating speed. If none of the multivibrators 70, 78 and 80 are in unstable condition when the wheel 8 trips the lever 16 none of the lights will light and the engineer will know that he can safely speed up the train. If desired, the multivibrator 80 can be set so that the green light will be an indication to speed up the train. Other timing devices may be substituted for the multivibrators 70, 78 and 80 and other means may be provided for determining the speed of the car. Thus, it is seen that applicants have provided an apparatus for attachment to a motion weigher which incorporates signals operable when the object being weighed exceeds a predetermined speed or is below a predetermined speed and which prevents operation of the weight recorder when the object exceeds a predetermined speed.

While one embodiment of our invention has been shown and described it will be apparent that other adaptations and modifications may be made without departing from the scope of the following claims.

We claim:

1. Apparatus for weighing a moving vehicle comprising platform means for receiving said vehicle, means actuatable by said platform means to record the weight of the vehicle, first timing means operable for a predetermined period of time upon actuation, second timing means operable for a predetermined period of time upon actuation, means to actuate said second timing means substantially at the conclusion of the period of operation of the first timing means, first control means adapted to be operated by a vehicle to be weighed when the vehicle passes a selected position with respect to the platform means, said first control means adapted to initiate operation of the first timing means when operated, second control means positioned to be operated by the vehicle subsequent to said vehicle's operation of the first control means, means responsive to said first timing means and said second control means to prevent recording of vehicle weight when the second control means is operated during the period of operation of the first timing means, and signal means responsive to said second timing means and said second control means to signal when the second control means is operated during the period of operation of the second timing means, whereby when the speed of a vehicle is greater than a predetermined value no weight will be recorded therefor, and when the speed of the vehicle is within a predetermined range below said predetermined value a signal will be given.

2. Apparatus for weighing a moving vehicle comprising a platform for receiving said vehicle, means responsive to said platform for recording the weighing of said vehicle, a first monostable multivibrator adapted to operate for a predetermined period of time, first control means operable by said vehicle to initiate operation of said first multivibrator, a second monostable multivibrator adapted to operate for a predetermined period of time upon actuation, means to actuate said second multivibrator substantially when the period of operation of the first multivibrator is complete, second control means operable by the vehicle after it has traveled a predetermined distance subsequent to the vehicle's operation of the first control means, means responsive to said first multivibrator and said second control means to prevent recording of vehicle weight when said second control means is operated during the period of operation of the first multivibrator, and means responsive to said second multivibrator and said second control means adapted to permit operation of said weight recording means and to signal when said second control means is actuated during the period of operation of the second multivibrator, whereby when the vehicle is travelling faster than a first predetermined speed no weight will be recorded and when it is travelling at a speed range below a given speed range a signal will be given and the weight recorded.

References Cited in the file of this patent

UNITED STATES PATENTS

| | | |
|---|---|---|
| 1,626,920 | Coleman | May 3, 1927 |
| 2,347,194 | Holliday | Apr. 25, 1944 |
| 2,623,163 | Bone | Dec. 23, 1952 |
| 2,723,844 | Thurston | Nov. 15, 1955 |
| 2,770,775 | Agnew | Nov. 13, 1956 |
| 2,806,685 | Sande | Sept. 17, 1957 |
| 2,819,682 | Falkowski | Jan. 14, 1958 |

FOREIGN PATENTS

| | | |
|---|---|---|
| 625,622 | Germany | Feb. 12, 1936 |